(12) United States Patent
Clark

(10) Patent No.: US 8,094,713 B2
(45) Date of Patent: Jan. 10, 2012

(54) METHOD AND SYSTEM FOR VIEWER QUALITY ESTIMATION OF PACKET VIDEO STREAMS

(75) Inventor: Alan Clark, Duluth, GA (US)

(73) Assignee: Telchemy, Inc., Duluth, GA (US)

( * ) Notice: Subject to any disclaimer, the term of this patent is extended or adjusted under 35 U.S.C. 154(b) by 846 days.

(21) Appl. No.: 12/174,279

(22) Filed: Jul. 16, 2008

(65) Prior Publication Data

US 2009/0041114 A1 Feb. 12, 2009

Related U.S. Application Data

(60) Provisional application No. 60/949,988, filed on Jul. 16, 2007, provisional application No. 60/951,321, filed on Jul. 23, 2007.

(51) Int. Cl.
*H04N 7/12* (2006.01)
(52) U.S. Cl. ............... 375/240.01; 375/240.27
(58) Field of Classification Search .............. None
See application file for complete search history.

(56) References Cited

U.S. PATENT DOCUMENTS

| | | | |
|---|---|---|---|
| 6,370,199 B1 * | 4/2002 | Bock et al. | 375/240.28 |
| 6,741,569 B1 | 5/2004 | Clark | |
| 7,058,048 B2 | 6/2006 | Clark | |
| 7,075,981 B1 | 7/2006 | Clark | |
| 7,826,527 B2 * | 11/2010 | Wang | 375/240 |
| 2003/0037337 A1 * | 2/2003 | Yona et al. | 725/95 |
| 2007/0009045 A1 | 1/2007 | Mohandas | |
| 2007/0133608 A1 | 6/2007 | Isambart | |
| 2008/0285656 A1 * | 11/2008 | Au et al. | 375/240.22 |

OTHER PUBLICATIONS

Chakareski, Jacob, et al.; "Distortion Chains for Predicting the Video Distortion for General Packet Loss Patterns"; Streaming Media Systems Group, Herlett-Packard Labs, Palo Alto CA; Information Systems Laboratory, Stanford University, Stanford, CA, Jul. 2011.
Kanumuri, Sandeep, et al; "A Generalized Linear Model for MPEG-2 Packet-Loss Visibility", Jul. 2011.
Rose, O; "Simple and Efficient Models for Variable Bit Rate MPEG Video Traffic"; University of Wurzburg Institute of Computer Science Research Report Series; Jul. 1995.

* cited by examiner

*Primary Examiner* — Hong Cho
(74) *Attorney, Agent, or Firm* — Smith, Gambrell & Russell

(57) ABSTRACT

A method and system for the estimation of the effect of packet loss on a viewer's subjective perception of a packet video stream. The method involves estimating a quality metric for every frame in the video stream, accumulating such metrics over time, and transforming the result into a Mean Opinion Score ("MOS") which represents the viewer's subjective perception of the video stream. The method takes into account various factors such as frame rate, frame types and sizes, decoding algorithms, propagated error rates, and the effect of video content on viewer perception. The method can be used for both encrypted and unencrypted video streams.

11 Claims, 3 Drawing Sheets

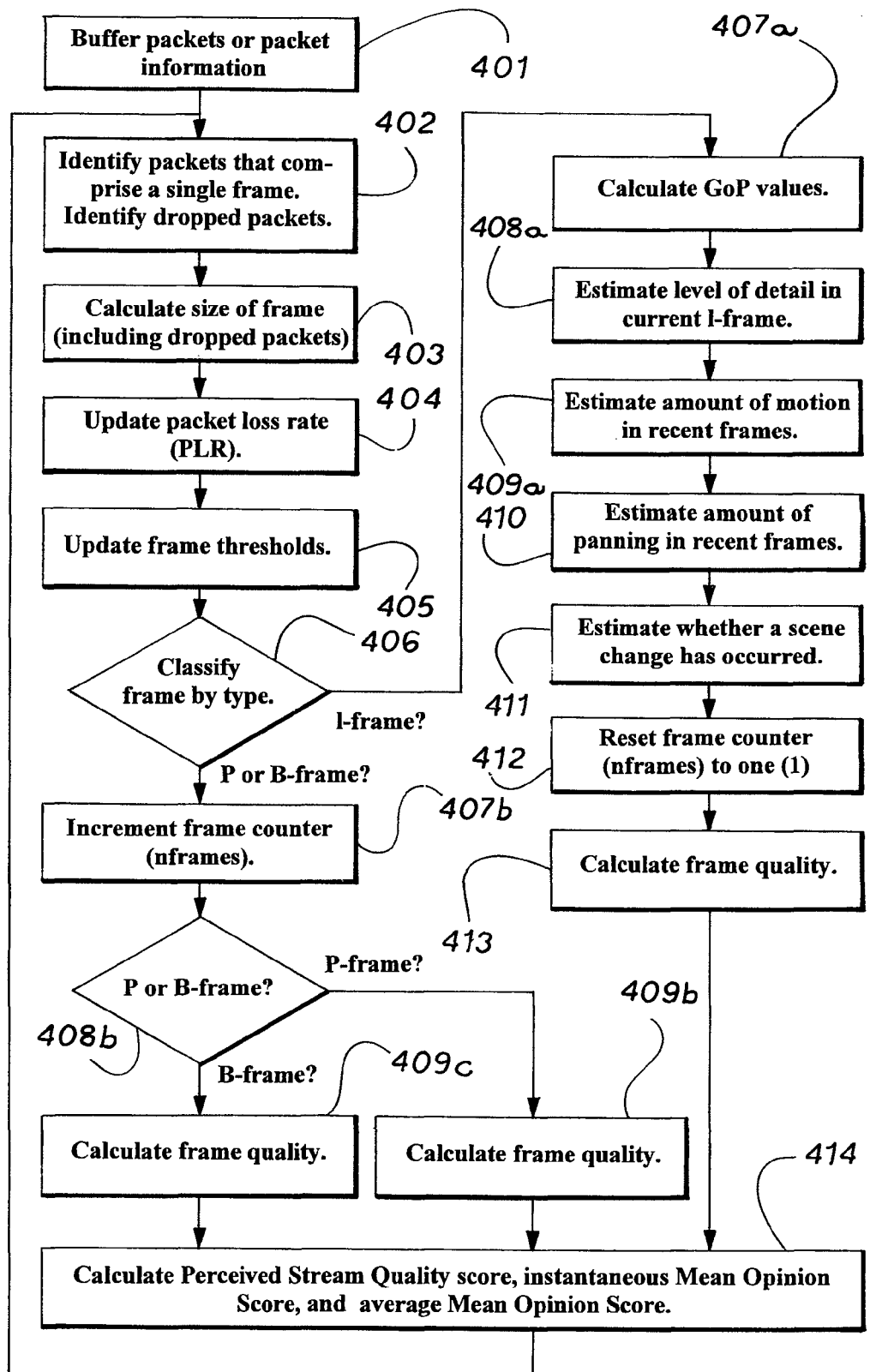

METHOD AND SYSTEM FOR VIEWER QUALITY ESTIMATION OF PACKET VIDEO STREAMS

CROSS-REFERENCE TO RELATED APPLICATIONS

This application claims priority to U.S. provisional application No. 60/949,988, filed Jul. 16, 2007, and U.S. provisional application No. 60/951,321, filed Jul. 23, 2007, both of which are incorporated herein by reference.

BACKGROUND OF THE INVENTION

Packet video systems such as High Definition Television ("HDTV") and Internet Protocol Television ("IPTV") are becoming increasingly important today and are replacing older non-packet broadcast television and video streaming. Such packet video systems can experience transmission problems which lead to lost or delayed packets. This, in turn, can cause a degradation in the quality of service delivered to the end-viewer such as frozen or distorted images.

Providers of broadcast or streaming video commonly encrypt video streams to ensure that only authorized persons can view the video content. While this encryption is necessary to prevent the unauthorized dissemination of the provider's video content, encryption also precludes easy diagnosis of transmission problems within the packet network. This is because packet analyzing systems cannot analyze degradations within an encrypted video stream to determine what effect those degradations might have on the quality of service delivered to the end-viewer. Because not all packet losses within a video stream will have a human-perceptible impact on the quality of the video, it is necessary for a network analyzer to determine the type and content of packets that are lost. Thereafter, the analyzer can estimate the subjective effects of the lost packets on the viewer.

It is well known in the art that most packet video systems display a series of pictures (or "frames"), each frame representing a small change from the previous frame. Frames are usually updated 10-50 times per second. Digital video that is carried over packet networks is usually compressed using standard methods such as MPEG2, MPEG4, or H.264. These compression techniques produce three distinct types of frames, denoted as I-frames, P-frames, and B-frames, respectively. Each frame has a picture header that identifies the type of frame and contains other data related to the image size and encoding.

I-frames ("intra" frames) are intra-frame encoded frames that do not depend upon past or successive frames in the video stream to aid in the reconstruction of the video image at the video receiver. Rather, the I-frame itself contains all the information needed to reconstruct an entire visible picture at the video receiver. As such, the I-frame is the largest in size of the three types of frames, typically 2-5 times as large as a P-frame or B-frame. Because of its large size, an I-frame must often be broken up and sent in multiple packets over the packet network. An I-frame (along with a P-frame) is also known as a "reference frame" because it provides a point of reference from which later frames can be compared for reconstruction of a video image.

P-frames ("predicted" frames) are inter-frame encoded frames that are dependent upon prior frames in the video stream to reconstruct a video image at the video receiver. In essence, P-frames contain only the differences between the current image and the image contained in a prior reference frame. Therefore, P-frames are typically much smaller than I-frames, especially for video streams with relatively little motion or change of scenes. P-frames are also reference frames themselves, upon which successive P-frames or B-frames can rely for encoding purposes.

B-frames ("bi-directionally predicted" frames) are inter-frame encoded frames that depend both upon prior frames and upon successive frames in the video stream. B-frames are the smallest type of frame and cannot be used as reference frames.

A typical video stream is divided up into a series of frame units, each known as a "Group of Pictures" ("GoP"). Each GoP begins with an I-frame and is followed by a series of P and B-frames. The length of the GoP can be either fixed or variable. A typical GoP might last for 15 frames. In video sequences where there is little motion and few scene changes, the P and B-frames will tend to be small because little has changed in the image since the previous reference frame. However, in a video sequence with considerable motion or many scene changes, the P and B-frames will be considerably larger because they must contain more data to indicate the large amount of changes from the previous reference frame. Some video compression algorithms will even include an I-frame in the middle of a GoP when necessitated by a large amount of motion or a scene change in the video sequence. This allows successive P and B-frames to reference the recent I-frame and hence they can contain smaller amounts of data.

The size of the encoded frames can also depend upon the amount of detail in the video sequence to be encoded. Images in a video sequence with a high detail will produce encoded frames with more data than video sequences with a low detail.

As discussed previously, not all packet losses or packet delays will have a human-perceptible impact upon a video sequence. The loss of a single B-frame will have little impact, because no other frames are dependent upon that frame and hence the image will only be distorted for the fraction of a second corresponding to the single B-frame. The loss of a reference frame (an I-frame or P-frame), however, will affect any P-frame or B-frame that depends on the reference frame. A series of packet losses—especially those involving reference frames—will begin to cause human-perceptible degradations in the video image quality. Furthermore, losses of reference frames at the beginning of a scene change or during high-motion video sequences are more likely to cause human-perceptible distortions than losses of reference frames in relatively static video sequences. Conversely, losses of non-reference frames during scene changes or high-motion video sequences are less likely to produce noticeable distortions because the visual artifact is obscured by the rapid changes in the images presented to the viewer.

The GoP length and structure can be fixed or variable, depending upon the particular video stream. For streams with a fixed GoP structure, the I, P, and B frames occur at well-defined and fixed intervals within the video stream. In such a case, a network analyzer can easily determine whether a lost packet is part of an I, P, or B frame even if the video stream is encrypted. However, if the GoP structure within an encrypted video stream is variable or unknown to the network analyzer, then the network analyzer cannot readily determine the nature or content of a lost packet. Prior art systems have attempted to partially decrypt packets to determine their content. However, this will only work if the network analyzer has the encryption key.

SUMMARY OF THE INVENTION

The invention provides a system and method for the estimation of the effect of packet loss on a viewer's subjective perception of a packet video stream. The invention considers the impact of packet loss during time intervals on a packet video stream, as described in U.S. Pat. No. 7,058,048, and the impact of time varying impairments, as described in U.S. Pat. No. 6,741,569, both of which are incorporated herein by reference.

The invention works by first examining the packet headers to identify the set of packets comprising a frame transmitted within a time interval (as described in U.S. Pat. No. 7,058,048). (Because large frames are broken up into multiple packets, it cannot be assumed that each frame is contained in a single packet.) A network analyzer can accomplish this task, for example, by examining the timestamp fields contained in the RTP (Real-time Transport Protocol) headers of the packets in the video stream. Packets with identical timestamps comprise a single frame interval.

Next, the analyzer classifies the frame observed within the interval as an I, P, or B-frame. For unencrypted video streams, the analyzer can simply read the frame type from the picture header. For encrypted video streams, the analyzer can read the frame type directly if it has the appropriate decryption key. Alternatively, the analyzer can estimate the type of the frame based on the size (in bytes) of the frame. As described earlier, I, P, and B frames are respectively large, medium, and small in relation to one another.

In embodiments where the analyzer estimates the frame type based on the size of the frames, the network analyzer will begin by counting the number of bytes in the frame. It can do this by determining the size of the data payload in each packet and summing this value for all packets that comprise the frame. The analyzer will also estimate the size of any packets that were dropped and include this estimate in its overall byte count for the frame.

The analyzer can detect a dropped packet by examining the packet sequence numbers, for example the RTP sequence number, to find any gaps in the sequence. (Because packets can travel in a non-sequential order, the analyzer will have to maintain a list of recently observed sequence numbers. It can then classify a missing sequence number as dropped if it has not been seen after a sufficient length of time.) The analyzer can estimate the size of a dropped packet based on the average size of the packets. Such an average can be computed, for example, as a weighted average of the last n packets, as an average of all packets received, or as an average over packets within the given GoP. In addition, the average could be limited to packets containing data of the same frame type (I, P, or B). The network analyzer can further calculate the average packet loss rate by determining the proportion of packets in the video stream that are dropped.

The network analyzer will keep one or two "frame threshold" values so it can estimate the varying sizes of the I, P, and B-frames. Because I-frames are so much larger than P and B-frames, those frames with a byte count above a certain threshold ("I-frame threshold") will be classified as I-frames. Similarly, some embodiments utilize a separate (lower) threshold ("P-frame threshold") to discriminate between P and B-frames because the former are usually significantly larger than the latter. The I and P-frame thresholds can be continuously updated based on the varying sizes of the frames in the video stream.

The network analyzer can also maintain values for the maximum, minimum, and average sizes of I, P, and B-frames, respectively. These values can be continuously updated. For each frame encountered, the network analyzer can compare its size to the average frame size of its type and compute the variance for the given frame. The network analyzer can further maintain average values for the frame variances.

After determining the frame type, the number of packets received during the frame interval and the number of packets lost during the frame interval, the analyzer will estimate the received video quality for the frame interval. The received video quality is a number that represents an estimation of the subjective quality of the video signal that would be obtained by decoding the packets received during the frame interval. The quality of a decoded I-frame is dependent upon the number of encoded video packets transmitted during the I-frame interval that were lost. Packet losses in an I-frame will also affect inter-frame encoded (P and B-frames) that reference the I-frame. Thus, the impact of packet losses in an I-frame will be propagated into other frames.

The quality of inter-frame encoded P and B-frames is affected both by packet losses within the affected frame and by any losses propagated from the reference frame on which the frame depends. In addition, packet losses in a P-frame will be propagated to other inter-frame encoded frames that depend upon that P-frame.

After calculating a frame quality estimate for a given frame interval, the analyzer will update a value representing the overall quality of the video stream. Such a value can be scaled to take into account the number of frames per second in the video stream.

Next, the analyzer can calculate an instantaneous Mean Opinion Score ("MOS") which will reflect an estimate of the viewer's perceived quality of the video stream at a particular moment in time. The instantaneous MOS values can be averaged over time to give an average MOS value for the given time interval.

Because each I-frame usually starts a new GoP, the network analyzer can further calculate the length of each GoP it observes. The analyzer can also maintain maximum, minimum, average, and variance values for GoP length.

For each GoP, the analyzer can estimate the amount of detail, motion, or panning present in the GoP. Similarly, the analyzer can estimate if there has been a scene change from the prior GoP to the current GoP. The analyzer can accomplish this by comparing the frame sizes and GoP length to the various maxima, minima, and averages described above.

For instance, an I-frame that is relatively large in comparison to other I-frames in the video sequence indicates a high level of detail in the GoP of which it is a part. If a GoP contains P or B-frames that are relatively large, then the GoP is exhibiting a large amount of motion. Panning in a video sequence can be detected by the relatively more frequent insertion of I-frames within consecutive GoP's. A scene change is indicated when an I-frame is inserted in the middle of a single GoP.

In some embodiments, the network analyzer can utilize these estimates of the content of the video stream to refine the frame quality estimates, instantaneous MOS scores, and average MOS scores. As described above, losses of reference frames at the beginning of a scene change or during high-motion video sequences are more likely to cause human-perceptible distortions than losses of reference frames in relatively static video sequences. Conversely, losses of non-reference B-frames during scene changes or high-motion video sequences are less likely to produce noticeable distortions because the visual artifact is obscured by the rapid changes in the images presented to the viewer.

BRIEF DESCRIPTION OF THE DRAWINGS

FIG. 4 is a flow diagram illustrating the operation of the network analyzer in one embodiment of the invention.

DETAILED DESCRIPTION OF THE PREFERRED EMBODIMENTS

Figure 1:
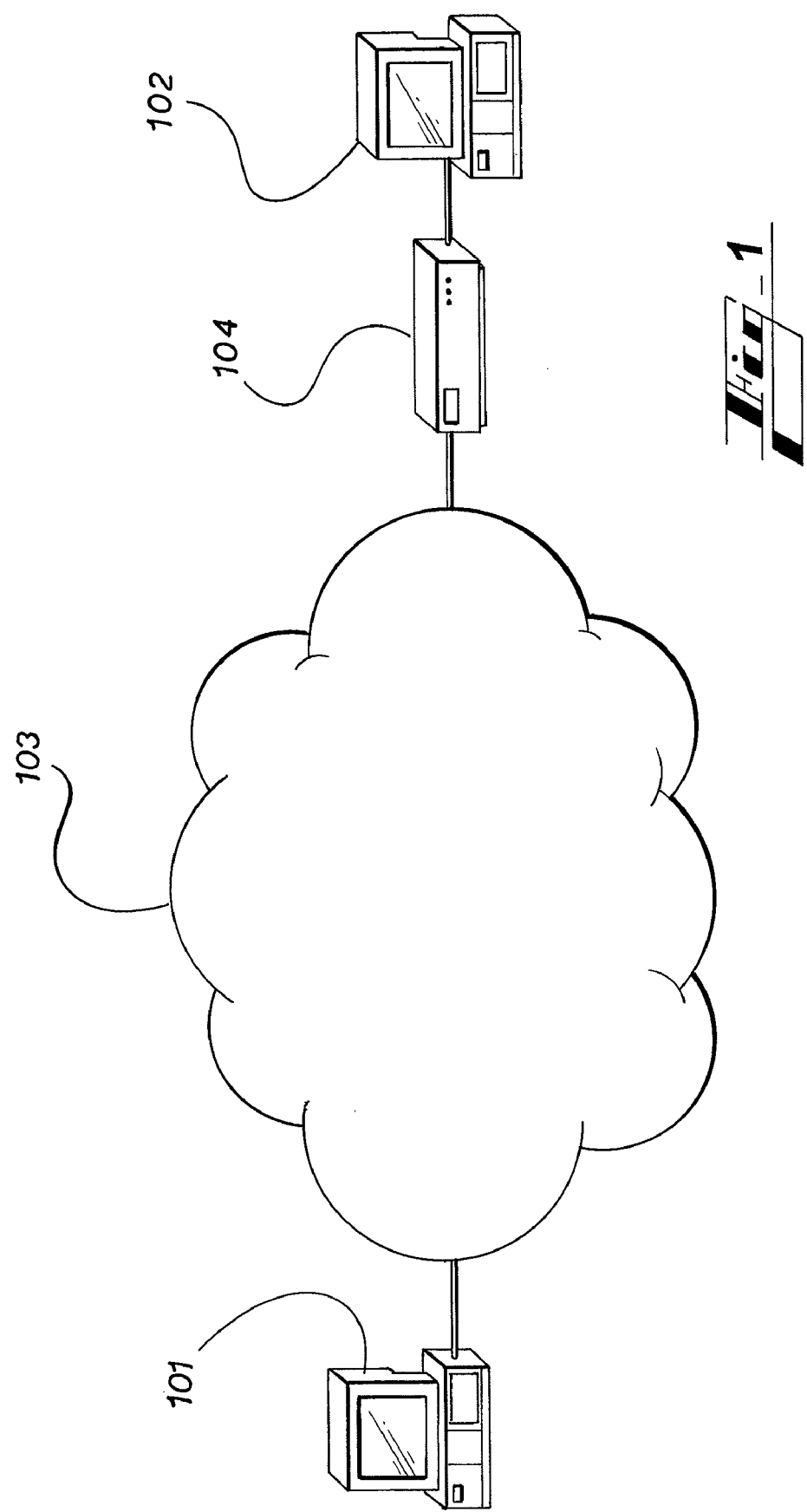
FIG. 1 is a block diagram of a system in one embodiment of the invention.

FIG. 1 is a diagram of a system in one embodiment of the invention. A video source 101 is sending a packet video stream to a video receiver 102 over a packet network 103, said packet network could operate over a cable, DSL, fiber optic, wireless or other transmission media. The video source 101 could be, for example, an internet web server streaming video to the receiver 102. Alternatively, the video source 101 could be a broadband cable television company streaming video to the receiver 102. Likewise, the video receiver 102 could be a computer or a television set. The packet network 103 could be the Internet or a private network.

A network analyzer 104 reads the packets that are being sent from sender 101 to recipient 102. The network analyzer 104 could be incorporated into a set-top box, television set, IP gateway, network router, optical network receiver, residential gateway, or the like. Alternatively, the network analyzer 104 could be a stand-alone test and measurement device or probe. The network analyzer 104 could be implemented in software running on a general purpose device or with special-purpose hardware. The network analyzer 104 will perform the measurements and calculations described further herein.

Figures 2, 3:
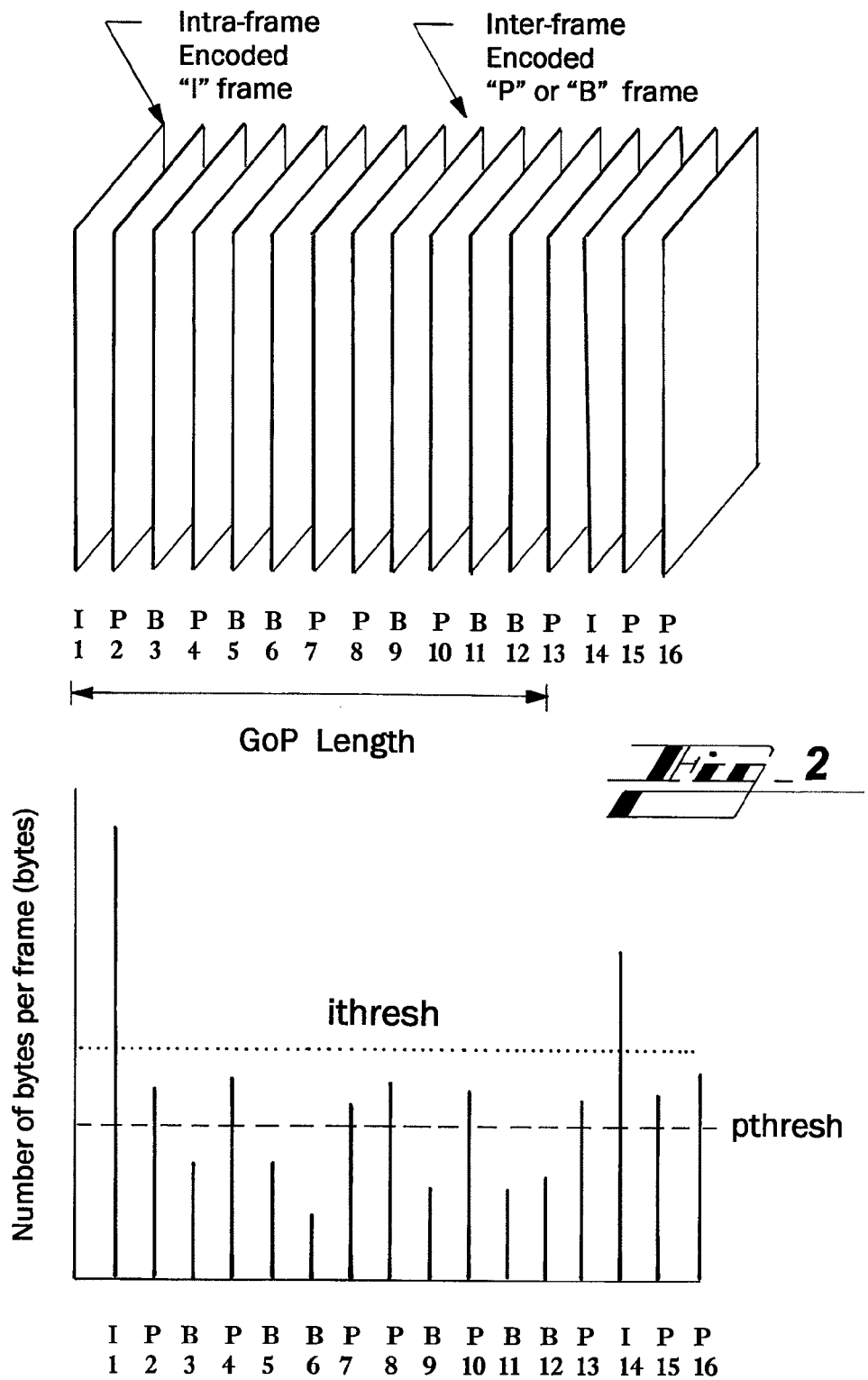
FIG. 2 is an illustration of a Group of Pictures (GoP) within a packet video stream.
FIG. 3 is a chart demonstrating the various sizes (in bytes) of frames within a GoP.

FIG. 2 shows a representative view of a Group of Pictures within a packet video stream. It will be noted that the underlying packets carrying the frames are not shown. The frame intervals (frames) are shown in sequence from left to right. The I-frame labeled 1 is the first frame in the GoP. Following it are twelve inter-frame encoded (P and B-frames) in the same GoP. The I-frame labeled 14 begins a new GoP.

FIG. 3 shows a representative view of the size (in bytes) of the data comprising the frames of the GoP of FIG. 2. It will be noted that the I-frames are typically significantly larger than the P or B-frames. It will also be noted that the P-frames are larger than the B-frames. As will be explained further below, "ithresh" and "pthresh" represent the threshold sizes for I-frames and P-frames respectively.

FIG. 4 is a flow diagram illustrating the operation of the network analyzer in one embodiment. At step 401, the analyzer will buffer or store certain information for each packet that it encounters. Such information will include the packet sequence number, transmission timestamp field (if present), arrival timestamp and the size (in bytes) of the data payload. The analyzer must buffer a sufficient number of packets so it can 1) correlate packets containing the same timestamp and 2) detect lost packets using the sequence numbers.

At step 402, the analyzer will identify all packets corresponding to a frame interval either by recognizing that they have identical transmission timestamps or by recognizing marker flags in the packet headers. These packets comprise a single frame of the video sequence and correspond to a frame interval.

The analyzer will also determine the number (if any) of packets that have been lost during the present frame by examining the sequence numbers contained in the packets. If a sequence number is missing and is not received within a certain time period (1 sec, e.g.), then the network analyzer will assume that the packet has been dropped by the network. (Because packets can arrive in a non-sequential order, the network analyzer cannot immediately assume that a missing packet has been dropped. Rather, the missing packet could simply have traveled over a slower network segment than the subsequent packet(s).) Dropped packets that appear at a frame boundary—i.e., between packets with differing timestamps—can be arbitrarily assigned to the preceding or succeeding frame. Alternatively, such dropped boundary packets could be assigned based on other factors, such as the size or type of the preceding or succeeding frames.

The network analyzer will also calculate the average size of the data payload in the packets observed over a period of time. Such an average could be taken over all packets received, as a weighted average of the last n packets, or as an average over all packets within the last n GoPs. In some embodiments, separate averages could be maintained for packets containing data of the same frame type (I, B, or P). The identification of frame type will be described in step 406, below.

Some embodiments will maintain counters that keep running totals for the number of packets lost and the total number of packets in the video stream(s) (either received or lost) over a period of time. The network analyzer could periodically reset such counters to zero at specified times such as the beginning of a video stream or the beginning of a day, week, month, etc.

The following table illustrates the values that will be calculated in step 402:

TABLE 1

| Value | Description | Calculation |
|---|---|---|
| npackets_lost | Number of packets lost during the frame interval. | <Reset to zero at the beginning of each frame. Incremented each time a lost packet is detected.> |
| npackets_received | Number of packets actually received during the frame interval. | <Reset to zero at the beginning of each frame. Incremented each time a packet is received.> |
| npackets | Number of packets in the present frame interval (including lost packets). | npackets_lost + npackets_received |
| av_packet_size | Average size of packet data payload (over multiple frame intervals) for a given time period. | <Average size over the last n packets.> |
| total_npackets_lost | Total number of packets lost (over multiple frame intervals) for a given time period. | <Incremented each time a lost packet is detected.> |
| total_npackets | Total number of packets in video stream(s) (over multiple frame intervals) for a given time period. | <Incremented each time a packet is received or a lost packet is detected.> |

At step 403, the network analyzer will calculate the size (in bytes) of the frame identified in step 402. It will do this by summing the data payload size for all the packets received during a frame interval. The network analyzer will include in this calculation an estimated payload size of any lost packet(s) that were part of the frame. Such an estimate can be based on the average packet size (av_packet_size) computed in step 402.

The following table represents the data that will be measured, estimated, or calculated during step 403.

TABLE 2

| Value | Description | Calculation |
|---|---|---|
| nbytes_received | Number of bytes actually observed for the present frame. | <Measured value> |
| estimated_nbytes_lost | Estimated number of bytes lost in dropped packets for the present frame interval. | estimated_nbytes_lost = npackets_lost * av_packet_size |
| nbytes | Number of bytes for the present frame interval (including estimate of lost bytes.) | nbytes = nbytes_received + estimated_nbytes_lost |
| av_nbytes | †Average number of bytes per frame over the past 16 frame intervals. | av_nbytes = (av_nbytes * 15 + nbytes)/16 |
| total_nbytes_lost | Total number of bytes lost (over multiple frame intervals) for a given time period. | total_nbytes_lost = total_nbytes_lost + estimated_nbytes_lost |
| total_nbytes | Total number of bytes in video stream(s) (over multiple frame intervals) for a given time period. | total_nbytes = total_nbytes + nbytes |

†Av_nbytes can be calculated using a variety of averaging techniques, as described above in relation to av_packet_size.

As described above, nbytes_received is simply the total size of the data payloads for the present frame interval that were actually observed by the network analyzer. Estimated_nbytes_lost represents the aforementioned estimate of the number of bytes lost in dropped packets for the frame interval. Finally, nbytes represents an estimate of the actual number of bytes in the frame interval.

Total_nbytes_lost and total_nbytes are running counters that accumulate (over multiple frames) the values of estimated_nbytes_lost and nbytes, respectively. These counters can be reset to zero at different times in different embodiments. For instance, they could be reset to zero at the beginning of each video stream; after n number of packets, frames, or GoPs; or after n number of seconds, minutes, hours, or days. Alternatively, they could be reset to zero arbitrarily by the user or only when the network analyzer is first installed.

Some embodiments will maintain total_npackets_lost and total_npackets (as calculated in step 402) in lieu of, or in addition to, total_nbytes_lost and total_nbytes.

In step 404, the network analyzer will calculate and update a value representing the packet loss rate ("PLR"). This value simply represents the proportion of sent packets that have been dropped in the network. It can be calculated using either of the following two equations:

$$PLR = total\_npackets\_lost/total\_npackets \quad (Eq. 1)$$

$$PLR = total\_nbytes\_lost/total\_nbytes \quad (Eq. 2)$$

Equation 1 is more precise than Equation 2 because the latter includes estimated sizes of dropped packets, as discussed above.

At step 405, the network analyzer will perform calculations to update the frame thresholds. In FIG. 3, the "ithresh" line indicates the I-frame threshold level and the "pthresh" line indicates the P-frame threshold level. The network analyzer will classify frames that have a byte count above ithresh as I-frames. Likewise, it will classify frames with a byte count above pthresh (but below ithresh) as P-frames. Any frames with a byte count lower than pthresh will be classified as B-frames.

To calculate the I-frame threshold, the network analyzer will maintain a value for the largest I-frame ("scaled_iframe"). This value will periodically be multiplied by a scaling factor (less than 1.0). The scaling factor will gradually reduce the value stored in scaled_max_iframe to compensate for abnormally large I-frames.

The network analyzer will compare every newly encountered frame with scaled_max_iframe. If the newly encountered frame has more bytes than scaled_max_iframe, then the latter will be set to the former. In essence, this step will search for a new maximum sized I-frame. The following pseudo-code illustrates the calculation of scaled_max_iframe.

scaled_max_iframe=scaled_max_iframe*0.995 // Apply scaling factor if (nbytes>scaled_max_iframe) then //New maximum I-frame
scaled_max_iframe=nbytes Finally, the network analyzer will update the value of ithresh. The analyzer can use a variety of algorithms to periodically recalibrate ithresh. These algorithms apply scaling factors to such variables as scaled_max_iframe and av_nbytes. For example, in one embodiment, the network analyzer will calculate ithresh as follows:

ithresh=(scaled_max_iframe/4+av_nbytes*2)/2

This calculation averages two heuristics to calculate the I-frame threshold level. First, the I-frame threshold level is estimated as being one-quarter of the maximum scaled I-frame (scaled_max_iframe/4). Second, the I-frame threshold level is estimated as being twice the size of the average frame size (av_nbytes*2). These two estimates are then averaged to calculate ithresh.

In other embodiments, the network analyzer could calculate ithresh by applying scaling factors to other variables such as av_iframe_size and max_iframe_size (explained below) or ithresh itself. Different scaling factors can also be used.

The network analyzer can calculate pthresh in a similar manner to ithresh. First, the network analyzer will maintain a value for the maximum scaled P-frame:

scaled_max_pframe=scaled_max_pframe*0.995// Apply scaling factor if ((nbytes>scaled_max_pframe) && (nbytes<ithresh)) then
//New maximum P-frame
scaled_max_pframe=nbytes Second, the network analyzer will calculate pthresh using a heuristic:

pthresh=av_nbytes*(¾)

This heuristic sets the P-frame threshold at three-quarters of the average size of all (I, P, and B) frames. Other embodiments can apply other scaling factors and use different variables such as av_pframe_size (explained below) and scaled_max_pframe.

At step 406, the network analyzer will classify the present frame as being an I-frame, P-frame, or B-frame. It will do this by comparing the size of the present frame with the values for ithresh and pthresh. The network analyzer will also calculate average values for the size of I-frames, P-frames, and B-frames, respectively. Finally, the network analyzer will calculate a variance for the present frame and an average variance over time. A frame's variance is simply the amount by which the frame is above or below average size (of the same type). The following table illustrates the values that will be calculated in step 406, depending upon which frame type is detected (I, P, or B):

TABLE 3

| Value | Description |
|---|---|
| av_iframe_size | Average size of the last n I-frames. |
| iframe_variance | Variance of the present I-frame. |
| av_iframe_variance | Average variance of the last n I-frames. |
| av_pframe_size | Average size of the last n P-frames. |
| pframe_variance | Variance of the present P-frame. |
| av_pframe_variance | Average variance of the last n P-frames. |
| av_bframe_size | Average size of the last n B-frames. |
| bframe_variance | Variance of the present B-frame. |
| av_bframe_variance | Average variance of the last n B-frames. |

The following pseudo-code illustrates the classification of the frames by type and the calculation of the aforementioned values:

```
if (nbytes > ithresh OR frame type decoded as "I") then
    /* I-frame detected */
    av_iframe_size = (av_iframe_size * 7 + nbytes) / 8
    iframe_variance = abs(nbytes − av_iframe_size)
    av_iframe_variance = (av_iframe_variance * 7+
            iframe_variance) / 8
else if (nbytes > pthresh OR frame type decoded as "P") then
    /* P-frame detected */
    av_pframe_size = (av_pframe_size * 7 + nbytes) / 8
    pframe_variance = abs(nbytes − av_pframe_size)
    av_pframe_variance = (av_pframe_variance * 7+
            pframe_variance) / 8
else
    /* B-frame detected */
    av_bframe_size = (av_bframe_size * 7 + nbytes) / 8
    bframe_variance = abs(nbytes − av_bframe_size)
    av_bframe_variance = (av_bframe_variance * 7+
            bframe_variance) / 8
```

From the pseudo-code, it can be seen that the present frame is classified based on its size in relation to ithresh and pthresh. One can also see that the average frame size is taken as a running average over the previous frames of the same type (whether an I, P, or B-frame.) The "abs" function in the pseudo-code represents an absolute value function that is used to calculate the amount the present frame is above or below average. Finally, the frame variances are computed as running averages over the previous frames of the same type.

It will be recognized by those skilled in the art that different averaging algorithms could be used to calculate the average frame size and average frame variance. Such averages could be taken over all (or n) previous frames of the same type, for example.

It will further be recognized that the network analyzer could, in certain embodiments, read the frame type directly from the packets received during frame intervals that comprise the various frames. If the packets were encrypted, either the above described algorithm could be used to detect the frame type based on size or the network analyzer would need to decrypt the packets using the appropriate decryption key before reading the frame type from the packets.

If an I-frame was detected in step 406, then the network analyzer will proceed to step 407a, where it will calculate values related to the GoP length. The following table describes the data that will be calculated in step 407a:

TABLE 4

| Value | Description |
|---|---|
| nframes | A counter for the number of frames in the current Group of Pictures (GoP). |
| last_GoP_length | The total number of frames in the immediately preceding GoP. |
| penultimate_GoP_length | The total number of frames in the penultimate GoP. |
| av_GoP_length | The average number of frames in a GoP for a given time period. |
| max_GoP_length | The number of frames in the largest GoP encountered. |

The following pseudo-code illustrates the logic used to calculate the data of Table 4:

```
penultimate_GoP_length = last_GoP_length
last_GoP_length = nframes
av_GoP_length = (av_GoP_length * 15 + last_GoP_length) / 16
if (last_GoP_length > max_GoP_length) then
    max_GoP_length = last_GoP_length
```

The nframes counter represents the number of frames encountered (so far) in a GoP. Because an I-frame, usually begins a new GoP, the nframes counter will, at the beginning of step 407a, contain a value indicating the length of the immediately prior GoP. (As will be seen in steps 407b and 412, the nframes counter is incremented whenever a P-frame or B-frame is encountered and reset to one (1) after an I-frame is encountered.)

At the beginning of step 407a, the network analyzer will move the current value in last_GoP_length to penultimate_GoP_length. The analyzer will then save the nframes value as last_GoP_length. Thus, the analyzer will maintain the GoP length for the last two GoPs. Some embodiments of the invention could maintain an array of multiple GoP lengths going back an arbitrary number of GoPs.

Next, the network analyzer will update the value representing the average size of a GoP, av_GoP_length. In the pseudo-code above, the network analyzer calculates a running average GoP length. Such an average could be taken over the past n GoPs and/or could be periodically reset at the beginning of a video stream or beginning of a time period such as an hour, day, week, month, etc.

The network analyzer will also update the value of max_GoP_length if the previous GoP was the longest GoP encountered so far. Like av_GoP_length, max_GoP_length could be periodically reset to zero.

At step 408a, the network analyzer will estimate the amount of detail present in the most recent I-frame. Detailed images require relatively large I-frames; conversely, images with little detail result in relatively small I-frames. Thus, the network analyzer can compare the size (in bytes) of the most recent I-frame with the maximum I-frame encountered. This is illustrated by the following:

```
if (nbytes > 0.75 * scaled_max_iframe) then
    detail = high
else if (nbytes < 0.3 * scaled_max_iframe) then
    detail = low
else
    detail = medium
```

Those skilled in the art will recognize that nbytes could instead be compared to the average I-frame size (av_iframe_size), the maximum I-frame size (max_iframe_size), or some combination of the above. It will further be recognized that percentages other than 75% and 30% could be used to determine the level of detail. In addition, finer granularity could be achieved by making more comparisons.

At step 409*a*, the network analyzer will estimate the amount of motion in the recent frames. High levels of motion result in larger than average P and B frames. Thus, the analyzer can compare the sizes of recent P and B frames with historical maxima (such as scaled_max_iframe):

```
av_pbframe_size = (av_pframe_size + av_bframe_size) / 2
if (av_pbframe_size > 0.25 * scaled_max_iframe) then
    motion = high
else if (av_pbframe_size > 0.125 * scaled_max_iframe) then
    motion = medium
else if (av_pbframe_size > 0.05 * scaled_max_iframe) then
    motion = low
else
    motion = none
```

This pseudo-code begins by combining the average frame size for recent P-frames and B-frames. It is important that av_pframe_size and av_bframe_size are weighted averages over recent past P-frames and B-frames, respectively. Thus, the combined av_pbframe_size represents the average frame size of recent P and B-frames.

Next, the analyzer compares av_pbframe_size against scaled_max_iframe to determine the comparative size of the recent P and B-frames. In this embodiment, if av_pbframe_size is greater than 25% of the size of the largest scaled I-frame, then the analyzer will record that the video stream is experiencing a high degree of motion. If av_pbframe_size is at least 12.5% of scaled_max_iframe (but less than 25%), then the video stream is classified as exhibiting a medium amount of motion. An av_pbframe_size above 5% of scaled_max_iframe (but below 12.5%) indicates low motion. Any av_pbframe_size below 5% of scaled_max_iframe is classified as having little to no motion.

Those skilled in the art will recognize that the network analyzer could make other similar comparisons to determine the degree of motion in the video stream. For instance, the size of the recent P and B-frames could be compared to the average size of I-frames instead of a maximum scaled (or non-scaled) I-frame size. Additionally, the size of recent P and B-frames could be compared to maximum P and B-frame sizes. The size of recent P and B-frames could be compared to average P and B-frames over an extended period of time (as opposed to simply the last eight P and B-frames.) The size of recent P and B-frames could also be compared to idealized or empirical values for average P and B-frames. The network analyzer could use different percentages than the 25%, 12.5%, and 5% described above. The analyzer could also make more or fewer comparisons to increase or decrease the granularity of its estimations. The analyzer could also make these comparisons for each individual P-frame or B-frame rather than for an average of the recent P and B-frames.

At step 410, the network analyzer will estimate whether there has been panning in the recent frames. Panning is the lateral motion of a camera within a scene. When a video stream contains panning, new I-frames must be sent more frequently to convey the constantly changing image data. This is unlike the motion described in step 409*a* where the camera remains focused on an object (or group of objects) that are moving.

The network analyzer can detect the increased frequency of I-frames characteristic of panning by examining the length of the last two (or more) GoPs. If those GoPs are relatively short in comparison to other GoPs, then the network analyzer will conclude that the video sequence contains panning data. The following pseudo-code illustrates this concept:

```
if ( (last_GoP_length < 0.6 * max_GoP_length) &&
     (penultimate_GoP_length < 0.6 * max_GoP_length) ) then
    panning = true
else
    panning = false
```

In this embodiment, the network analyzer will determine that the video sequence is exhibiting panning if the last two GoPs are less than 60% the size of the maximum GoP length. In embodiments that keep a record of three or more GoPs, then the network analyzer could make comparisons over multiple GoPs.

Those skilled in the art will recognize that these comparisons could be made with percentages other than 60%. It will further be recognized that comparisons could be made to an average GoP length (rather than max_GoP_length).

At step 411, the network analyzer will estimate if there has been an abrupt scene change in the video sequence. An abrupt scene change often results in an I-frame being sent to mark the scene change. This I-frame may truncate the previous GoP or simply be inserted into the GoP, resulting in an apparently short GoP. A scene change is different from panning in that the former results in a single short GoP whereas the latter results in several short GoPs in a row.

The following pseudo-code illustrates the detection of a scene change:

```
if ( (last_GoP_length < max_GoP_length) &&
     (penultimate_GoP_length = max_GoP_length) ) then
    scene_change = true
else
    scene_change = false
```

In this embodiment, the network analyzer will determine that the video sequence has experienced a scene change if the prior GoP length was abnormally short while the penultimate GoP length was equal to max_GoP_length. In video systems that employ variable GoP sizes, the comparison would be made based on the similarity of the penultimate GoP to the average GoP rather than exact equivalence.

Those skilled in the art will recognize that these comparisons could be made with other statistical characteristics of previous GoP lengths. Further, in embodiments that maintain a record for the past three (or more) GoPs, the network analyzer could search for an abnormally truncated GoP in between two (or more) average sized GoPs.

At step 412, the analyzer will reset the value of nframes to one (1). This is because the current I-frame is the first frame in the new GoP.

At step 407*b*, the analyzer will increment the value of nframes each time the analyzer encounters a P or B-frame. In this manner, the nframes counter will properly count the frames in a GoP, starting with an I-frame and ending with the last P or B-frame before the next I-frame.

Steps 413, 409*b*, and 409*c* represent the computation of the frame quality estimate ("frame_quality") for I, P, and B-frames, respectively. The frame_quality value is computed slightly differently for each type of frame.

At step 413, the analyzer will compute frame_quality if an I-frame is detected. First, the analyzer must compute or otherwise determine the following values:

TABLE 5

| Value | Description |
| --- | --- |
| n_slices | Number of "slices" in an I-frame. |
| FLC | Frame loss concealment factor. |

A "slice" is a portion of an I-frame that is internally encoded within the I-frame. As such, each slice represents a discrete unit of a given I-frame. By way of illustration, a slice may be 16 or 32 pixels high with a width equal to the width of the frame. The number of slices per I-frame typically does not change during a video stream and thus need only be calculated or determined one time for a given stream.

The frame loss concealment factor ("FLC") is a value between 0 and 1 that represents the effectiveness of the frame loss concealment algorithm within the video decoder. Such an algorithm is used to hide or conceal frame losses from the viewer through interpolation techniques that attempt to guess the data that would have been provided by the lost packet(s). An FLC value of 1 represents the lack of a concealment algorithm within the decoder—i.e., no concealment. An FLC value of 0 represents a theoretical "perfect" concealment algorithm that can compensate perfectly for any number of lost packets. A typical decoder might have an FLC value of 0.8.

The FLC value can be assigned to a given decoder based on the manufacturer's specifications or based on empirical evidence of that decoder's effectiveness in concealing lost packets. If multiple decoders are capable of decoding a given video stream, then the network analyzer could calculate separate frame_quality values for each of the multiple decoders using their respective FLC factors.

The following equation illustrates the calculation of the I-frame frame_quality value in step 413, where 0 represents the highest frame quality and 100 represents the poorest frame quality:

$$\text{frame\_quality} = \min(100, 100*(n\text{packets\_lost}*FLC/(2*n\_\text{slices}))) \quad \text{(Eq. 3)}$$

As described in step 402, npackets_lost represents the number of packets that were lost within the present frame. The npackets_lost value is divided by (2*n_slices) because it is estimated that a lost packet will, on average, affect half of a slice. Because slices are internally encoded, the loss of a packet in a slice will affect the remainder of the slice. Assuming that packet losses will randomly occur at the beginning, middle, or end of a slice, the heuristic of Eq. 3 estimates that each lost packet in an I-frame will affect half a slice on average.

The quotient of npackets_lost divided by (2*n_slices) is then multiplied by FLC to take into account the effectiveness of the decoder in concealing the effects of the packet loss. As described above, an FLC of 1 represents no concealment while an FLC of 0 represents perfect concealment. The resulting product is multiplied by 100 to place the frame quality score on a 0-100 scale.

Finally, the minimum ("min") function is used to put a ceiling of 100 on the frame_quality calculation. As mentioned earlier, a frame_quality score of 100 represents the worst possible quality for a frame. After a certain number of lost packets within an I-frame, the frame quality is so degraded that it is immaterial if there are further packet losses within the same frame. Thus, a ceiling of 100 is put on the frame_quality score to reflect this fact.

After calculating frame_quality for the I-frame, the network analyzer will set a "propagated_frame_quality" variable equal to frame_quality:

$$\text{propagated\_frame\_quality} = \text{frame\_quality} \quad \text{(Eq. 4)}$$

The propagated_frame_quality value will be used in steps 409b and 409c to calculate the frame quality for P and B-frames. As its name implies, the propagated frame_quality value represents the propagation of errors from a reference frame into the inter-encoded P and B-frames that depend on the reference frame.

Step 408b represents the discrimination between P and B-frames. The network analyzer will compare nbytes to pthresh or, if the video stream is not encrypted, will obtain the frame type from the video packet header. If nbytes is greater than pthresh or the video packet header indicates a P-frame, then a P-frame has been detected. Otherwise, a B-frame has been detected.

At step 409b, the network analyzer will compute frame_quality if a P-frame is detected, using the following equation:

$$\text{frame\_quality} = \min(100, [100*[(n\text{packets\_lost}/n\text{packets})*(K*n\text{bytes/scaled\_max\_}i\text{frame})*FLC] + \text{propagated\_frame\_quality}]) \quad \text{(Eq. 5)}$$

In Eq. 5, the proportion of lost packets in the P-frame is calculated from the ratio of (npackets_lost/npackets). Next, the ratio of the size of the current P-frame to the size of a maximum (scaled) I-frame is calculated: (nbytes/scaled_max_iframe). This ratio is multiplied by the constant "K". "K" is a scaling factor that represents the relative size of a typical I-frame in comparison to a typical P-frame. As such, "K" could be calculated by the ratio of (av_iframe_size/av_pframe_size). Alternatively, "K" could be set to an idealized, theoretical, or empirical ratio between a typical I-frame and a typical P-frame. Because I-frames are generally twice the size of P-frames, a typical value for "K" could be two.

The product of (npackets_lost/npackets)*(K*(nbytes/scaled_max_iframe)) thus represents the proportion of the P-frame that is distorted due to packet loss. This product is further multiplied by FLC to take into account the frame loss concealment algorithm of the decoder. This product is then multiplied by 100 to place the frame quality score on a 0-100 scale. Next, the propagated_frame_quality score from the previous reference frame is combined with this P-frame's frame_quality score after which a ceiling of 100 is applied. As discussed above, errors from the previous reference frame will be propagated into the current P-frame.

After calculating the frame_quality score for the P-frame, the network analyzer will set propagated_frame_quality equal to frame_quality, as described above in Eq. 4. The analyzer does this because the P-frame is also a reference frame and its errors will propagate into successive inter-encoded frames.

In step 409c, the network analyzer will calculate frame_quality for a B-frame using Eq. 5, described above. However, constant "K" will be tailored for B-frames in step 409c. That is, "K" will be a scaling factor that represents the relative size of a typical I-frame in comparison to a typical B-frame. As such, "K" could be calculated by the ratio of (av_iframe_size/av_bframe_size). Alternatively, "K" could be set to an idealized, theoretical, or empirical ratio between a typical I-frame and a typical B-frame. Constant "K" for B-frames will be slightly larger than for P-frames because B-frames are generally smaller than P-frames.

At step 414, the network analyzer will use the frame_quality score for the current frame to calculate a Perceived Stream Quality ("PSQ") score and an instantaneous Mean Opinion Score ("MOS"). This instantaneous MOS score can then be averaged with previous MOS scores to calculate an average MOS score corresponding to the overall video stream.

The following equation illustrates the calculation performed by the network analyzer to calculate the PSQ score. The PSQ score represents the perceived quality of the video stream over time. It is on a 0-100 scale where 100 represents the highest perceived quality and 0 represents the poorest perceived quality. (It will be noted that this scale is the opposite of that for the frame_quality value.)

$$PSQ=(PSQ*(frame\_rate\_scaling\_factor-1)+(100-frame\_quality))/frame\_rate\_scaling\_factor \quad (Eq.\ 6)$$

Before performing the calculation in Eq. 6, the frame_rate_scaling_factor value is set to the frame rate (the number of frames per second) of the video stream. Eq. 6 uses this frame_rate_scaling_factor to convert the frame_quality value to a scale that is independent of the frame rate. It will be noted in Eq. 6 that frame_quality is subtracted from 100 in order to flip the 0-100 scale.

The algorithm of Eq. 6 can be further refined because viewers are generally quicker to perceive degradations in video quality than they are to perceive improvements in video quality. In the following pseudo-code, the frame_rate_scaling_factor is increased (doubled) if there is an improvement in video quality.

frame_rate_scaling_factor=frame_rate if ((100−frame_quality)>PSQ) then
//The frame quality has improved. Because viewers are slow to notice improvements, we should double the scaling factor.

frame_rate_scaling_factor=2*frame_rate $$PSQ=(PSQ*(frame\_rate\_scaling\_factor-1)+(100-frame\_quality))/frame\_rate\_scaling\_factor$$

After calculating the PSQ score, the network analyzer will use the PSQ score to calculate an instantaneous MOS ("MOS_I"), as seen in the following equation:

$$MOS\_I=1+PSQ*0.038+PSQ*(PSQ-70)*(80-PSQ)*0.000007 \quad (Eq.\ 7)$$

This function for conversion to an estimated MOS is similar to other such functions familiar to practitioners of the art, the numerical values were derived from empirical testing.

Finally, the network analyzer will update a value for the average MOS score ("MOS_avg") for the video stream, utilizing the latest MOS_I score. Such an average can be kept over all MOS_I scores or over the past n MOS_I scores.

Following step 414, the network analyzer will examine the next frame in the buffer and repeat steps 402-414 over again.

Other embodiments of the invention could utilize the content estimation of steps 408a-411 in order to better estimate the perceived viewer quality in step 414, as described below:

Scene Change Embodiment

As described above, packet losses in P or B-frames shortly after a scene change will be relatively less perceptible to a person viewing the video sequence than packet losses during a static scene. This is because the scene change presents so much new information to the viewer that he cannot perceive slight degradations in the video quality.

When this embodiment detects a scene change, it will adjust the frame_quality calculations to discount the effect of subsequent packet losses. Such a discounting will be limited to the first several frames following the scene change.

To implement this algorithm, the network analyzer, in step 411, will set a temporal_mask value to a positive integer if the analyzer detects a scene change. This temporal_mask represents the number of successive frames that the network analyzer will discount or dampen the results of packet loss on the frame_quality value. A typical value for the temporal_mask might fall in the range from 1-5. The analyzer can use a higher number for video streams with a rapid frame rate and a lower number for streams with a slow frame rate.

In steps 409b and 409c, the network analyzer will apply a dampening factor ("G") to the frame_quality calculation of Eq. 5 if temporal_mask is greater than zero. The dampening factor is a value between 0 and 1 where 1 represents no dampening and 0 represents complete dampening. A typical value for G might be 0.8 which represents 20% dampening. In addition, the analyzer will decrement the value of temporal_mask. The following pseudo-code illustrates the modification of Eq. 5 that is used in this embodiment:

```
G = 1 //Default = no dampening
if (temporal_mask > 0) then
   //The video stream has recently changed scenes, so we can
discount the effects of any packet losses
   G = 0.8 //Dampen the frame_quality score by 20%. (i.e., 1 − 0.8).
   temporal_mask = temporal_mask − 1 //Decrement the mask
   frame_quality = (G * min(100, 2*( (npackets_lost / npackets) * (K *
(nbytes / scaled_max_iframe)) * FLC) )) + propagated_frame_quality
```

This algorithm could be further refined in other embodiments by changing the value of G based on the temporal_mask. For instance, the value of G could increase towards 1.0 every time the temporal_mask is decremented. This increase in G would represent a decrease in the level of dampening as the video stream progressed past the scene change event.

Level of Detail Embodiment

Packet losses in video streams with a relatively high level of detail will be more readily observed than packet losses in low-detail video streams. In this embodiment, the network analyzer, in step 414, will further modify the PSQ score to reflect the level of detail in the video stream:

$$PSQ=100-100*((100-PSQ)/100)^D \quad (Eq.\ 8)$$

The exponent "D" is adjusted according to the level of detail detected in step 408a. D is set to 1 for video streams with a medium level of detail. D is set to a positive number less than 1 for video streams with a high level of detail. D is set to a number greater than 1 for video streams with a low level of detail. A typical value of D for a high-detail video stream might be 0.9. A typical value of D for a low-detail stream might be 1.3.

The algorithm of Eq. 8 essentially magnifies the effects of packet loss for high-detail streams and dampens the effects of packet loss for low-detail streams. It should be noted that Eq. 8 will be performed after Eq. 6 but before calculating MOS_I in Eq. 7.

Level of Motion Embodiment

Small amounts of packet loss in video streams with a relatively high level of motion may be less noticeable than packet losses in low-motion video streams. In this embodiment, the network analyzer, in step 414, will further modify the PSQ score to reflect the level of motion in the video stream:

$$PSQ=100-100*((100-PSQ)/100)^M \quad (Eq.\ 9)$$

The exponent "M" is adjusted according to the level of motion detected in step 409a. M is set to 1 if the video stream is exhibiting a medium level of motion. M is set to a positive number less than 1 if the stream is exhibiting a high level of motion. M is set to a number greater than 1 if the stream is exhibiting a low level of motion. A typical value of M during high-motion video might be 0.9. A typical value of M during low-motion video might be 1.3.

The algorithm of Eq. 9 magnifies the effects of packet loss during high-motion video sequences and dampens the effects of packet loss during low-motion sequences. It should be noted that Eq. 9 will be performed after Eq. 6 but before calculating MOS_I in Eq. 7.

Other Embodiments

Those skilled in the art will recognize that the content estimation of steps 408a-411 could be performed at other times. That is, steps 408a-411 need not be performed every time an I-frame is detected. In some embodiments, for instance, some or all of those steps could be performed at periodic intervals such as every ten seconds. In some embodiments, some or all of steps 408a-411 could be performed whenever a certain number of frames had been received.

Those skilled in the art will further recognize that the frame quality estimations of steps 413, 409b, and 409c need not be calculated after every frame. Likewise, the calculation of the PSQ, MOS_I, and MOS_avg scores in step 414 need not be calculated every time a frame is detected. Instead, in some embodiments, some or all of those values could be calculated at periodic intervals such as every ten seconds or after a certain number of frames had been detected.

In some embodiments, the frame_quality value of steps 413, 409b, and 409c can be calculated by a decoder or other device rather than the network analyzer. For instance, a decoder that performed a frame loss concealment algorithm could calculate the proportion of macroblocks within a given frame that required concealment and utilize that information to compute a frame_quality score. The decoder could then provide this score to the network analyzer which could simply use this calculated value rather than performing a calculation itself.

In some embodiments the network analyzer could incorporate the effects of degradation due to codec quantization level. If the codec is configured to use a low output bit rate then the video signal may be degraded due to coarse quantization. The frame quality level computed by the network analyzer would therefore be reduced if the overall bit rate was low and increased if the bit rate was high. This may be further improved by using the average bit rate of I-frames rather than of all frames as this would be less affected by motion within the video stream.

In some embodiments the network analyzer could consider the distribution of packet loss within frames. For example, if two adjacent packets were lost then it is more likely that a single slice would be affected. The network analyzer could therefore more accurately estimate the number of affected slices by considering the number of lost packets and their spacing.

In some embodiments, the network analyzer could forego counting the individual bytes in each packet and instead just count the number of packets per frame. Thus, the values for frame thresholds and frame sizes would be calculated based on the number of packets (rather than bytes) per frame. These embodiments would essentially operate at a higher level of granularity and would thus be less accurate in predicting frame type and estimating the content of the video sequence. Nevertheless, these embodiments would provide some level of content estimation for video streams.

The metrics and content estimation calculated by the network analyzer can be used as inputs to a video quality estimation algorithm such as an estimated peak signal to noise ratio (EPSNR). In addition, the data can be used to provide statistical data over time or immediate feedback to a network operator or automated system administrator to diagnose problems within a network. Such a network operator could try to repair those problems.

Accordingly, while the invention has been described with reference to the structures and processes disclosed, it is not confined to the details set forth, but is intended to cover such modifications or changes as may fall within the scope of the following claims.

What is claimed is:

1. A method for estimating the frame quality of an I-frame comprising the steps of:
   a) determining the number of packets missing from said I-frame as a first value ("npackets_lost");
   b) determining the number of slices in said I-frame as a second value ("n_slices");
   c) determining a scaling factor that represents a frame loss concealment factor of a decoder ("FLC");
   d) estimating that each loss of a packet during the transmission of said I-frame will affect an estimated percentage ("P") of the size of said I-frame; and
   e) producing a frame quality score from the values of npackets_lost, n_slices, FLC, and P.

2. The method of claim 1 further comprising the step of calculating a Mean Opinion Score utilizing said frame quality score.

3. A method for estimating the frame quality of an I-frame comprising the steps of:
   a) determining the number of packets missing from said I-frame as a first value ("npackets_lost");
   b) determining the number of slices in said I-frame as a second value ("n_slices");
   c) determining a first scaling factor that represents a frame loss concealment factor of a decoder ("FLC");
   d) multiplying said npackets_lost value by said FLC value;
   e) multiplying said n_slices value by a second scaling factor;
   f) dividing the result of step (d) by the result of step (e);
   g) multiplying the result of step (f) by a third scaling factor; and
   h) producing a frame quality score that is the lesser of the result of step (g) or a ceiling value.

4. The method of claim 3 further comprising the step of calculating a Mean Opinion Score utilizing said frame quality score.

5. A method for estimating the frame quality of an interframe encoded frame ("PB-frame") in a packet video stream comprising the steps of:
   a) determining the number of packets missing from said PB-frame as a first value ("npackets_lost");
   b) determining the number of packets originally present in said PB-frame as a second value ("npackets");
   c) determining a constant "K" that represents the relative size of a typical I-frame to said PB-frame;
   d) determining the number of bytes in said PB-frame ("nbytes");
   e) determining a first scaling factor that represents a frame loss concealment factor of a decoder ("FLC");
   f) determining the size in bytes of the largest scaled I-frame ("scaled_max_iframe") in said packet video stream;
   g) dividing npackets_lost by npackets;
   h) multiplying K by nbytes;
   i) dividing the result of step (h) by scaled_max_iframe;

j) multiplying the result of step (g) by the result of step (i);
k) multiplying the result of step (j) by FLC;
l) multiplying the result of step (k) by a second scaling factor;
m) adding the result of step (l) to any previously calculated frame quality score for a prior inter-frame encoded frame; and
n) producing a frame quality score that is the lesser of the result of step (m) or a ceiling value.

6. The method of claim 5 further comprising the step of multiplying said frame quality score by a dampening factor if said PB-frame occurs within a previously selected number of frames following a scene change event.

7. The method of claim 5 further comprising the step of calculating a Mean Opinion Score utilizing said frame quality score.

8. A method for calculating a perceived stream quality score of a packet video stream comprising:
a) determining the frame rate of said video stream;
b) multiplying said frame rate by a scaling factor to produce a first value N;
c) multiplying a prior perceived stream quality score by (N−1) to obtain a second value;
d) adding said second value to a previously determined frame quality score to obtain a third value; and
e) dividing said third value by N to produce said perceived stream quality score.

9. The method of claim 8 wherein said scaling factor is increased if said frame quality score is better than a previous frame quality score.

10. The method of claim 8 wherein said perceived stream quality score is increased if said video stream exhibits a relatively low level of detail and decreased if said video stream exhibits a relatively high level of detail.

11. The method of claim 8 wherein said perceived stream quality score is increased if said video stream exhibits a relatively low level of motion and decreased if said video stream exhibits a relatively high level of motion.

* * * * *